(12) United States Patent
Herbiet et al.

(10) Patent No.: US 7,959,895 B2
(45) Date of Patent: Jun. 14, 2011

(54) PROCESS FOR THE PRODUCTION OF ALUMINUM HYDROXIDE

(75) Inventors: Rene Gabriel Erich Herbiet, Eupen (BE); Norbert Wilhelm Puetz, Niederaussem (BE); Volker Ernst Willi Keller, Frechen (DE); Winfried Toedt, Steffeln-Auel (DE)

(73) Assignee: Martinswerk GmbH, Bergheim (DE)

( * ) Notice: Subject to any disclaimer, the term of this patent is extended or adjusted under 35 U.S.C. 154(b) by 255 days.

(21) Appl. No.: 12/304,488

(22) PCT Filed: Jun. 21, 2007

(86) PCT No.: PCT/IB2007/004509
§ 371 (c)(1),
(2), (4) Date: Dec. 12, 2008

(87) PCT Pub. No.: WO2008/090415
PCT Pub. Date: Jul. 31, 2008

(65) Prior Publication Data
US 2010/0061924 A1    Mar. 11, 2010

(51) Int. Cl.
*C01F 7/04* (2006.01)
(52) U.S. Cl. .................... 423/629; 423/600; 423/625
(58) Field of Classification Search ............ 423/625, 423/626, 627, 628, 629, 630
See application file for complete search history.

(56) References Cited

U.S. PATENT DOCUMENTS

| 3,268,295 A | 8/1966 | Armbrust, Jr. et al. |
| 4,989,794 A | 2/1991 | Askew et al. |
| 5,306,480 A | 4/1994 | Brown |

FOREIGN PATENT DOCUMENTS

| EP | 0469257 A2 | 2/1992 |
| EP | 0646415 A | 4/1995 |
| EP | WO0151419 A | 7/2001 |
| EP | 1206412 B1 | 9/2003 |
| EP | 1380540 A | 1/2004 |

OTHER PUBLICATIONS

Hart L D, "Alumina Chemicals (Science and Technology Handbook), Passage" Alumina Chemicals. Science and Technology Handbook, Westerville, American Ceramic Society, US, 1990, pp. 77-82, XP002409801.
Glen Mills Inc: "Tech Tips 9, The Media Issue; grinding media and the mills that use it", Internet Citation, [Online] 2004, XP002468871; Retrieved from the Internet: URL: http//www.glenmills.com/technical_library/techtips4.pdf> [retrieved on Feb. 12, 2008].
Gerhartz et al: "Ullmann's Encyclopedia of Industrial Chemistry (Abrasives to Aluminum Oxide); vol. A1; Edition 5" Ullmann's Encyclopedia of Industrial Chemistry. Abrasives to Aluminum Oxide; [Ullmann's Encyclopedia of Industrial Chemistry], Weinheim, VCH Verlag, DE, vol. A1, Jan. 1, 1985, pp. 587-588, XP002460375.

*Primary Examiner* — Stanley Silverman
*Assistant Examiner* — James A Fiorito
(74) *Attorney, Agent, or Firm* — James A. Jubinsky

(57) ABSTRACT

Process for the production of aluminum hydroxide flame-retardants by wet-miling and spray-drying an aluminum hydroxide containing slurry.

23 Claims, 11 Drawing Sheets

PROCESS FOR THE PRODUCTION OF ALUMINUM HYDROXIDE

REFERENCE TO RELATED APPLICATION

This application is the National Stage of International Patent Appl. No. PCT/IB2007/004509, filed on Jun. 21, 2007, the disclosure of which is incorporated herein by reference.

FIELD OF THE INVENTION

The present invention relates to a novel process for the production of aluminum hydroxide flame-retardants.

BACKGROUND OF THE INVENTION

Aluminum hydroxide has a variety of alternative names such as aluminum hydrate, aluminum trihydrate etc., but is commonly referred to as ATH. ATH particles find use as a filler in many materials such as, for example, plastics, rubber, thermosets, papers, etc. These products find use in diverse commercial applications such as wire and cable compounds, conveyor belts, thermoplastics moldings, wall claddings, floorings, etc. ATH is typically used to improve the flame retardancy of such materials and also acts as a smoke suppressant.

Methods for the synthesis of ATH are well known in the art. However, the demand for tailor made ATH grades is increasing, and the current processes are not capable of producing these grades. Thus, there is an increasing demand for superior methods of production for ATH.

SUMMARY OF THE INVENTION

Figure 1:
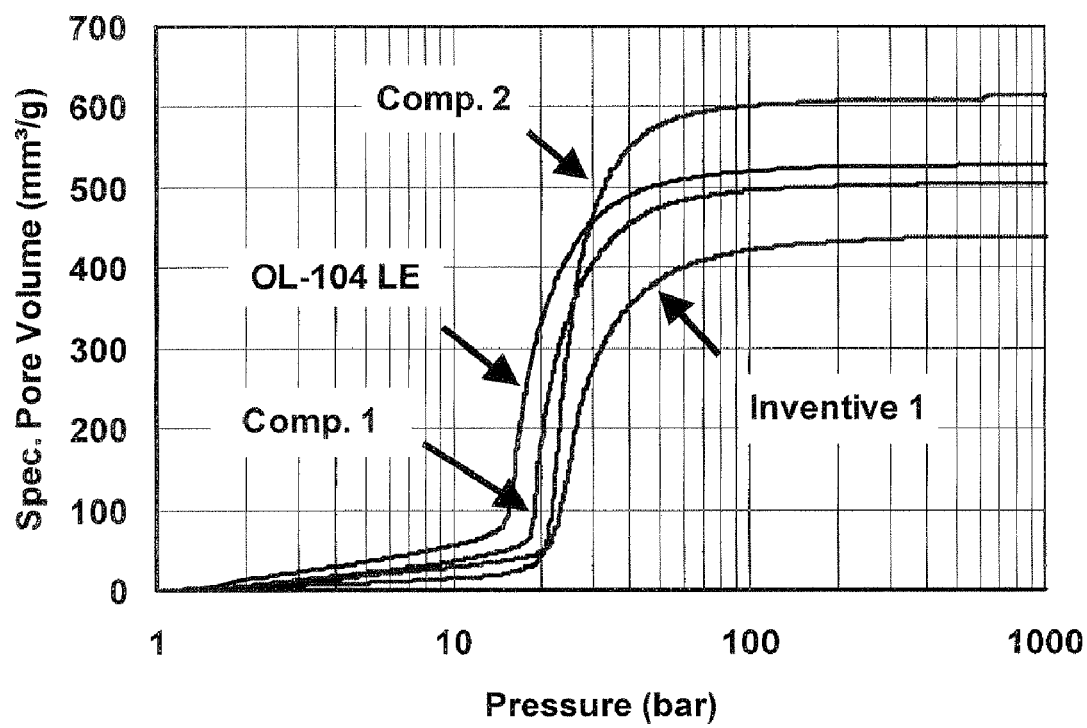
FIG. 1 shows the specific pore volume V as a function of the applied pressure for the second intrusion test run and an ATH grade no. 1, an ATH according to the present invention, in comparison with standard grades.

Higher compounding throughputs can be achieved through the use of ATH's with better wettability in a selected synthetic material (resin). An ATH with a poor wettability in the synthetic resin leads to higher variations in the power draw of the compounder motor during compounding, which in turn leads to, at best, a moderate compound quality, low throughputs, and, over time, can represent a considerable risk for damage to the engine of the compounding machine.

Therefore, in one embodiment, the present invention relates to a process that can produce ATH's with improved wettability. In this embodiment, the present invention comprises:

wet-milling a slurry comprising in the range of from about 1 to about 80 wt. % ATH, based on the total weight of the slurry, thus producing a milled ATH slurry, and spray-drying said milled ATH slurry thus producing a spray dried ATH.

wherein said wet-milling is conducted in the presence of a liquid using spherical milling media having a diameter in the range of from about 0.1 mm to about 1.0 mm and a density in the range of from about 1.5 to about 3 g/cm.

DETAILED DESCRIPTION OF THE INVENTION

The wettability of ATH particles with resins depends on the morphology of the ATH particles, and the inventors hereof have unexpectedly discovered that by using the process of the present invention, ATH particles having an improved wettability in relation to ATH particles currently available can be produced. While not wishing to be bound by theory, the inventors hereof believe that this improved wettability is attributable to an improvement in the morphology of the ATH particles produced by the process disclosed herein.

Slurry

The amount of ATH particles present in the slurry that is wet-milled is generally in the range of from about 1 to about 40 wt. %, based on the total weight of the slurry, preferably in the range of from about 5 to about 40 wt. %, more preferably in the range of from about 10 to about 35 wt.-%, most preferably in the range of from about 20 to about 30 wt. %, all on the same basis.

The ATH slurry that is wet-milled in the practice of the present invention can be obtained from any process used to produce ATH particles. Preferably the slurry is obtained from a process that involves producing ATH particles through precipitation and filtration. In an exemplary embodiment, the slurry is obtained from a process that comprises dissolving crude aluminum hydroxide in caustic soda to form a sodium aluminate liquor, which is cooled and filtered thus forming a sodium aluminate liquor useful in this exemplary embodiment. The sodium aluminate liquor thus produced typically has a molar ratio of $Na_2O$ to $Al_2O_3$ in the range of from about 1.4:1 to about 1.55:1. In order to precipitate ATH particles from the sodium aluminate liquor, ATH seed particles are added to the sodium aluminate liquor in an amount in the range of from about 1 g of ATH seed particles per liter of sodium aluminate liquor to about 3 g of ATH seed particles per liter of sodium aluminate liquor thus forming a process mixture. The ATH seed particles are added to the sodium aluminate liquor when the sodium aluminate liquor is at a liquor temperature of from about 45 to about 80° C. After the addition of the ATH seed particles, the process mixture is stirred for about 100 h or alternatively until the molar ratio of $Na_2O$ to $Al_2O_3$ is in the range of from about 2.2:1 to about 3.5:1, thus forming an ATH suspension. The obtained ATH suspension typically comprises from about 80 to about 160 g/l ATH, based on the suspension. However, the ATH concentration can be varied to fall within the ranges described above. The obtained ATH suspension is then filtered and washed to remove impurities therefrom, thus forming a filter cake. The filter cake is then re-slurried with water to form a slurry, as described above, suitable for use in the wet-milling procedure described herein. However, before the filter cake is re-slurried, it can be, and in preferred embodiments is, washed one, or in some embodiments more than one, times with water, preferably de-salted water, before re-slurrying.

However, in other exemplary embodiments, a dispersing agent is added to the filter cake to form a slurry. If a dispersing agent is added to the filter cake, it is within the scope of the present invention that the dispersing agent be added at any point prior to wet-milling. Non-limiting examples of dispersing agents include polyacrylates, organic acids, naphtalensulfonate/formaldehyde condensate, fatty-alcohol-polyglycol-ether, polypropylene-ethylenoxid, polyglycol-ester, polyamine-ethylenoxid, phosphate, polyvinylalcohol. If the slurry comprises a dispersing agent, the slurry may contain up to about 80 wt. % ATH, based on the total weight of the slurry, because of the effects of the dispersing agent. Thus, in this embodiment, the slurry typically comprises in the range of from 1 to about 80 wt. % ATH, based on the total weight of the slurry, preferably the slurry comprises in the range of from about 40 to about 75 wt. %, more preferably in the range of from about 45 to about 70 wt. %, most preferably in the range of from about 50 to about 65 wt. %, ATH, based on the total weight of the slurry.

The ATH particles in the slurry are generally characterized as having a BET in the range of from about 0.5 to 8 $m^2/g$. In preferred embodiments, the ATH particles in the slurry have a BET in the range of from about 1.5 to about 5 $m^2/g$, more preferably in the range of from about 2.0 to about 3.5 $m^2/g$ The ATH particles in the slurry are further characterized as having a $d_{50}$ in the range of from about 1.0 to 6.0 μm. In preferred embodiments, the ATH particles in the slurry have a $d_{50}$ in the range of from about 1.5 to about 3.5 μm, more preferably in the range of from about 2.0 to about 3.0 μm, which is coarser than the ATH product particles. By coarser, it is meant that the $d_{50}$ value of the ATH particles in the slurry is generally about 0.2-5 μm higher than the $d_{50}$ of the final ATH product particles.

The inventors hereof, while not wishing to be bound by theory, believe that the improved morphology of the spray-dried ATH produced by the present invention is at least partially attributable to the process used to precipitate the ATH. Thus, while wet-milling and spray drying techniques are known in the art, the inventors hereof have discovered that by using the precipitation and filtration processes described herein, including preferred embodiments, ATH particles having improved morphology, as described below, can be readily produced.

Wet-Milling

Wet-milling as used herein is meant to refer to the contacting of the ATH slurry with a milling media. The milling media used herein can be balls, rods, or other shapes made of various materials. Some common materials of construction for the milling media include ceramic, steel, aluminum, glass or zirconium oxide ($ZrO_2$).

In preferred embodiments, the inventors hereof have discovered that spray-dried ATH particles as described herein can be more readily produced through the use of spherical milling media having a diameter in the range of from about 0.1 mm to about 1.0 mm, preferably in the range of from about 0.4 mm to about 0.7 mm. Further, it is preferred that milling media having a density in the range of from about 1.5 to about 8.0 here g/cm³, preferably in the range of from about 1.5 to about 3.0 g/cm³, more preferably in the range of from about 2.0 to about 2.5 g/cm³ be used. In a particularly preferred embodiment, the milling media used herein is zirconium oxide beads.

The contacting of the ATH slurry with the milling media occurs in the presence of a liquid. Liquids suitable for use in wet-milling herein are any liquids that do not substantially solubilize the ATH. The liquid can be added prior to wet-milling, and the amount of liquid added is any amount to adjust the ATH concentration of the slurry to within the ranges discussed above. Preferably, the liquid is water. It should be noted that if the slurry has an ATH concentration within the range described above, there is no need to add additional liquid to it prior to wet-milling. However, even if the ATH concentration of the slurry is within the ranges discussed above, in some embodiments, it may still be desirable to add an additional amount of liquid to the slurry to provide for a slurry having a lower ATH concentration while still being within the ranges discussed above. It should be noted that if a dispersing agent is added to the filter cake, as described above, the contacting of the slurry with the milling media also occurs in the presence of the dispersing agent.

The conditions under which the wet-milling is conducted are conventional and readily selected by one having ordinary skill in the art and knowledge of the desired final product characteristics. Also, mills suitable for use in the wet-milling of the slurry are readily available commercially and include Pearl Mills, agitator bead mills, disk mills or circulation mill systems as e.g. those produced by the Netzsch company.

The wet-milling of the ATH slurry results in a milled ATH slurry that is recovered from the wet-milling operation by any technique commonly used to recover milled products from wet-milling operations. The recovered milled ATH slurry is then spray dried to produce an ATH product having improved morphology when compared to currently available ATH products.

Spray-Drying

Spray drying is a technique that is commonly used in the production of aluminum hydroxide. This technique generally involves the atomization of an ATH feed, here the milled ATH slurry, through the use of nozzles and/or rotary atomizers. The atomized feed is then contacted with a hot gas, typically air, and the spray dried ATH is then recovered from the hot gas stream. The contacting of the atomized feed can be conducted in either a counter or co-current fashion, and the gas temperature, atomization, contacting, and flow rates of the gas and/or atomized feed can be controlled to produce ATH particles having desired product properties.

The recovery of the spray dried ATH can be achieved through the use of recovery techniques such as filtration or just allowing the spray-dried particles to fall to collect in the spray drier where they can be removed, but any suitable recovery technique can be used. In preferred embodiments, the ATH is recovered from the spray drier by allowing it to settle, and screw conveyors recover it from the spray-drier and subsequently convey through pipes into a silo by means of compressed air.

The spray-drying conditions are conventional and are readily selected by one having ordinary skill in the art with knowledge of the desired ATH particle product qualities, described below. Generally, these conditions include inlet air temperatures between typically 250 and 550° C. and outlet air temperatures typically between 105 and 150° C.

The spray-dried ATH particles thus produced can be used "as is" in many applications. However, in some embodiments, the spray-dried ATH particles are further processed to reduce, or in some embodiments eliminate, agglomerates. Agglomerates are common in ATH particle production processes, and their presence can, and in some applications does, deleteriously affect the performance of the ATH particles in a resin. Therefore, the reduction, preferably elimination, of agglomerates is highly desired by ATH producers.

In the practice of the present invention, the number of agglomerates, or degree of agglomeration, present in the spray-dried ATH particles can be reduced by subjecting the spray-dried ATH particles to a further deagglomeration processing step.

Deagglomeration

By deagglomeration or deagglomerating, it is meant that the spray-dried ATH particles are subjected to a further treatment wherein the number of agglomerates, or degree of agglomeration, present in the spray-dried ATH particles are reduced (i.e. the number of agglomerates present in the spray-dried ATH particles is greater than the number of agglomerates present in the ATH product particles), in some embodiments substantially eliminated, with little reduction in the particle size of the spray-dried ATH. By "little particle size reduction" it is meant that the $d_{50}$ of the ATH product particles is greater than or equal to 90% of the spray-dried ATH particles. The rest of the properties of the spray-dried ATH particles are the same or substantially the same as the ATH product particles produced from deagglomerating the spray-dried ATH particles. In preferred embodiments, the $d_{50}$ of the spray-milled ATH is in the range of from about 90% to about 95% of the spray-dried ATH particles, more preferably within the range of from about 95% to about 99% of the spray-dried ATH particles.

The reduction in the agglomerates present in the spray-dried ATH particles can be achieved by using any technique known to be effective at reducing agglomerates. In preferred embodiments, the deagglomeration is achieved through the use of air classifiers or pin mills. In some embodiments, deagglomeration is achieved through the use of one or more pin mills, in other embodiments, one or more air classifiers. In preferred embodiments, the a pin mill. While not wishing to be bound by theory, the inventors hereof believe that the use of a pin mill may have the added benefit of producing an ATH product having a higher bulk density than the spray-dried ATH.

Air classifiers suitable for use herein include those using gravitational forces, centrifugal forces, inertial forces, or any combination thereof, to classify the ATH product particles. The use of these classifiers is well known in the art, and one having ordinary skill in the art and knowledge of the desired final ATH product size can readily select classifiers containing suitable screens and/or sieves.

Pin Mills suitable for use herein include dry and wet pin mills. As with air classifiers, the use of pin mills is well known in the art, and one having ordinary skill in the art and knowledge of the desired final ATH product particles properties can readily select the best pin mill to fit a particular application.

Improved Morphology Spray Dried ATH

In general, the process of the present invention can be used to produce spray dried ATH having many different properties. Generally, the process can be used to produce spray dried ATH having an oil absorption, as determined by ISO 787-5: 1980 of in the range of from about 1 to about 35%, a BET specific surface area, as determined by DIN-66132, in the range of from about 1 to 15 $m^2/g$, and a $d_{50}$ in the range of from about 0.5 to 2.5 µm.

However, the process of the present invention is especially well-suited to produce spray-dried ATH having an improved morphology when compared with currently available ATH. Again, while not wishing to be bound by theory, the inventors hereof believe that this improved morphology is attributable to the total specific pore volume and/or the median pore radius ($r_{50}$) of the ATH product particles. The inventors hereof believe that, for a given polymer molecule, an ATH product having a higher structured aggregate contains more and bigger pores and seems to be more difficult to wet, leading to difficulties (higher variations of the power draw on the motor) during compounding in kneaders like Buss Ko-kneaders or twin-screw extruders or other machines known in the art and used to this purpose. Therefore, the inventors hereof have discovered that the process of the present invention produces spray dried ATH characterized by smaller median pore sizes and/or lower total pore volumes, which correlates with an improved wetting with polymeric materials and thus results in improved compounding behavior, i.e. less variations of the power draw of the engines (motors) of compounding machines used to compound a flame retarded resin containing the ATH filler.

The $r_{50}$ and the $V_{max}$ of the spray-dried ATH particles produced by the present invention can be derived from mercury porosimetry. The theory of mercury porosimetry is based on the physical principle that a non-reactive, non-wetting liquid will not penetrate pores until sufficient pressure is applied to force its entrance. Thus, the higher the pressure necessary for the liquid to enter the pores, the smaller the pore size. A smaller pore size and/or a lower total specific pore volume were found to correlate to better wettability of the spray-dried ATH particles produced by the present invention. The pore size of the spray-dried ATH particles produced by the present invention can be calculated from data derived from mercury porosimetry using a Porosimeter 2000 from Carlo Erba Strumentazione, Italy. According to the manual of the Porosimeter 2000, the following equation is used to calculate the pore radius r from the measured pressure p: $r=-2\gamma \cos(\theta)/p$; wherein $\theta$ is the wetting angle and $\gamma$ is the surface tension. The measurements taken herein used a value of 141.3° for $\theta$ and $\gamma$ was set to 480 dyn/cm.

In order to improve the repeatability of the measurements, the pore size of the ATH particles was calculated from the second ATH intrusion test run, as described in the manual of the Porosimeter 2000. The second test run was used because the inventors observed that an amount of mercury having the volume $V_0$ remains in the sample of the ATH particles after extrusion, i.e. after release of the pressure to ambient pressure. Thus, the $r_{50}$ can be derived from this data as explained below with reference to FIGS. 1, 2, and 3.

In the first test run, a sample of spray-dried ATH particles produced by the present invention was prepared as described in the manual of the Porosimeter 2000, and the pore volume was measured as a function of the applied intrusion pressure p using a maximum pressure of 1000 bar. The pressure was released and allowed to reach ambient pressure upon completion of the first test run. A second intrusion test run (according to the manual of the Porosimeter 2000) utilizing the same ATH sample, unadulterated, from the first test run was performed, where the measurement of the specific pore volume V(p) of the second test run takes the volume $V_0$ as a new starting volume, which is then set to zero for the second test run.

In the second intrusion test run, the measurement of the specific pore volume V(p) of the sample was again performed as a function of the applied intrusion pressure using a maximum pressure of 1000 bar. FIG. 1 shows the specific pore volume V as a function of the applied pressure for the second intrusion test run and an ATH, grade no. 1, produced according to the present invention in comparison with current commercially available ATH products. The pore volume at 1000 bar, i.e. the maximum pressure used in the measurement, is referred to as $V_{max}$ herein.

Figure 2:
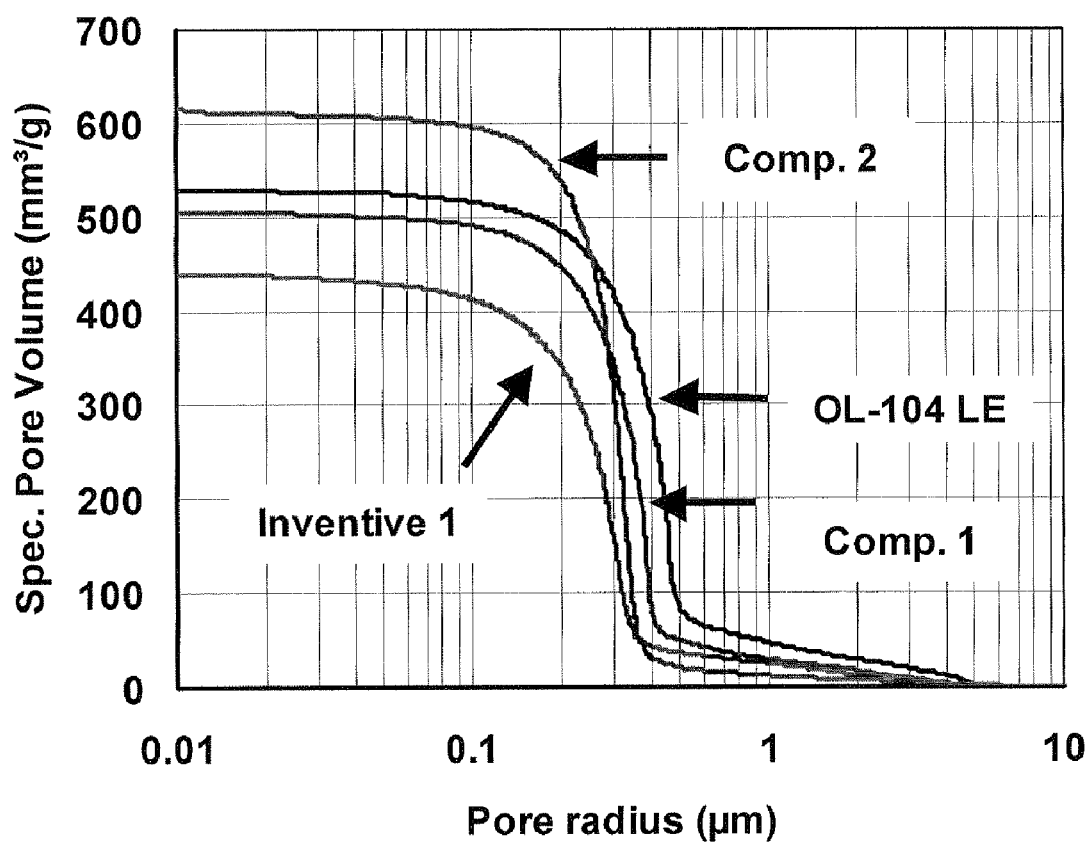
FIG. 2 shows the specific pore volume V plotted against the pore radius r for the second intrusion test run and an ATH grade no. 1, an ATH according to the present invention, in comparison with standard grades.

From the second ATH intrusion test run, the pore radius r was calculated by the Porosimeter 2000 according to the formula $r=-2\gamma \cos(\theta)/p$; wherein $\theta$ is the wetting angle, $\gamma$ is the surface tension and p the intrusion pressure. For all r-measurements taken herein, a value of 141.3° for $\theta$ was used and $\gamma$ was set to 480 dyn/cm. The specific pore volume can thus be plotted against the pore radius r. FIG. 2 shows the specific pore volume V of the second intrusion test run (using the same sample) plotted against the pore radius r.

Figure 3:
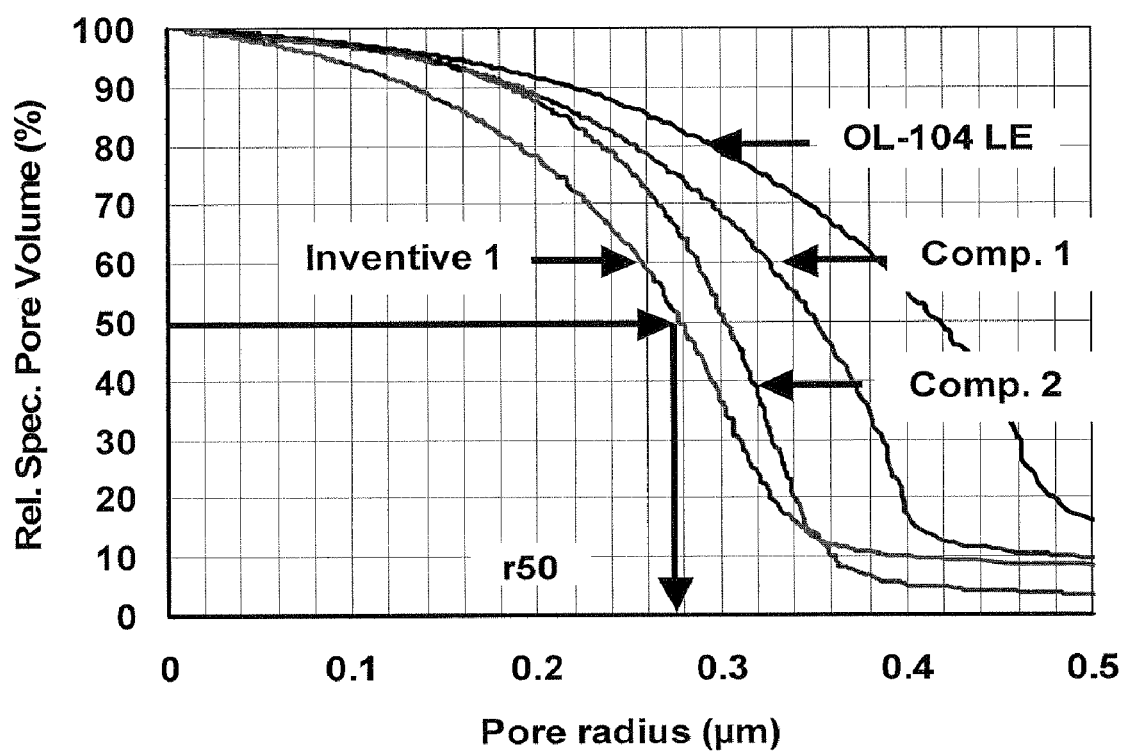
FIG. 3 shows the normalized specific pore volume for an ATH grade no. 1, an ATH according to the present invention, in comparison with standard grades, the graph was generated with the maximum specific pore volume for each ATH grade set at 100%, and the other specific volumes of the corresponding ATH grade were divided by this maximum value.

FIG. 3 shows the normalized specific pore volume of the second intrusion test run plotted against the pore radius r, i.e. in this curve, the maximum specific pore volume of the second intrusion test run, $V_{max}$, was set to 100% and the other specific volumes for that particular ATH were divided by this maximum value. The pore radius at 50% of the relative specific pore volume, by definition, is called median pore radius $r_{50}$ herein. For example, according to FIG. 3, the median pore radius $r_{50}$ for an ATH according to the present invention, i.e. Inventive 1, is 0.277 µm.

The procedure described above was repeated using samples of ATH particles produced according to the present invention, and the spray-dried ATH particles produced by the present invention were found to have an $r_{50}$, i.e. a pore radius at 50% of the relative specific pore volume, in the range of from about 0.09 to about 0.33 µm. In preferred embodiments of the present invention, the $r_{50}$ of the spray-dried ATH particles produced by the present invention is in the range of from about 0.20 to about 0.33 µm, more preferably in the range of from about 0.2 to about 0.3 µm. In other preferred embodiments, the $r_{50}$ is in the range of from about 0.185 to about 0.325 µm, more preferably in the range of from about 0.185 to about 0.25 µm. In still other preferred embodiments, the $r_{50}$ is in the range of from about 0.09 to about 0.21 µm, more preferably in the range of from about 0.09 to about 0.165 µm.

The spray-dried ATH particles produced by the present invention can also be characterized as having a $V_{max}$, i.e. maximum specific pore volume at 1000 bar, in the range of from about 300 to about 700 mm³/g. In preferred embodiments of the present invention, the $V_{max}$ of the spray-dried ATH particles produced by the present invention is in the range of from about 390 to about 480 mm³/g, more preferably in the range of from about 410 to about 450 mm³/g. In other preferred embodiments, the $V_{max}$ is in the range of from about 400 to about 600 mm³/g, more preferably in the range of from about 450 to about 550 mm³/g. In yet other preferred embodiments, the $V_{max}$ is in the range of from about 300 to about 700 mm³/g, more preferably in the range of from about 350 to about 550 mm³/g.

The spray-dried ATH particles produced by the present invention can also be characterized as having an oil absorption, as determined by ISO 787-5:1980 of in the range of from about 1 to about 35%. In some preferred embodiments, the spray-dried ATH particles produced by the present invention are characterized as having an oil absorption in the range of from about 23 to about 30%, more preferably in the range of from about 25% to about 28%, In other preferred embodiments, the spray-dried ATH particles produced by the present invention are characterized as having an oil absorption in the range of from about 25% to about 32%, more preferably in the range of from about 26% to about 30%. In yet other preferred embodiments, the spray-dried ATH particles produced by the present invention are characterized as having an oil absorption in the range of from about 25 to about 35% more preferably in the range of from about 27% to about 32%. In other embodiments, the oil absorption of the spray-dried ATH particles produced by the present invention are in the range of from about 19% to about 23%, and in still other embodiments, the oil absorption of the spray-dried ATH particles produced by the present invention is in the range of from about 21% to about 25%.

The spray-dried ATH particles produced by the present invention can also be characterized as having a BET specific surface area, as determined by DIN-66132, in the range of from about 1 to 15 m²/g, In preferred embodiments, the spray-dried ATH particles produced by the present invention have a BET specific surface in the range of from about 3 to about 6 m²/g, more preferably in the range of from about 3.5 to about 5.5 m²/g. In other preferred embodiments, the spray-dried ATH particles produced by the present invention have a BET specific surface of in the range of from about 6 to about 9 m²/g, more preferably in the range of from about 6.5 to about 8.5 m²/g. In still other preferred embodiments, the spray-dried ATH particles produced by the present invention have a BET specific surface in the range of from about 9 to about 15 m²/g, more preferably in the range of from about 10.5 to about 12.5 m²/g.

The spray-dried ATH particles produced by the present invention can also be characterized as having a $d_{50}$ in the range of from about 0.5 to 2.5 µm. In preferred embodiments, the spray-dried ATH particles produced by the present invention have a $d_{50}$ in the range of from about 1.5 to about 2.5 µm, more preferably in the range of from about 1.8 to about 2.2 µm. In other preferred embodiments, the spray-dried ATH particles produced by the present invention have a $d_{50}$ in the range of from about 1.3 to about 2.0 µm, more preferably in the range of from about 1.4 to about 1.8 µm. In still other preferred embodiments, the spray-dried ATH particles produced by the present invention have a $d_{50}$ in the range of from about 0.9 to about 1.8 µm, more preferably in the range of from about 1.1 to about 1.5 µm.

It should be noted that all particle diameter measurements, i.e. $d_{50}$, disclosed herein were measured by laser diffraction using a Cilas 1064 L laser spectrometer from Quantachrome. Generally, the procedure used herein to measure the $d_{50}$, can be practiced by first introducing a suitable water-dispersant solution (preparation see below) into the sample-preparation vessel of the apparatus. The standard measurement called "Particle Expert" is then selected, the measurement model "Range 1" is also selected, and apparatus-internal parameters, which apply to the expected particle size distribution, are then chosen. It should be noted that during the measurements the sample is typically exposed to ultrasound for about 60 seconds during the dispersion and during the measurement. After a background measurement has taken place, from about 75 to about 100 mg of the sample to be analyzed is placed in the sample vessel with the water/dispersant solution and the measurement started. The water/dispersant solution can be prepared by first preparing a concentrate from 500 g Calgon, available from KMF Laborchemie, with 3 liters of CAL Polysalt, available from BASF. This solution is made up to 10 liters with deionized water. 100 ml of this original 10 liters is taken and in turn diluted further to 10 liters with deionized water, and this final solution is used as the water-dispersant solution described above.

The above description is directed to several embodiments of the present invention. Those skilled in the art will recognize that other means, which are equally effective, could be devised for carrying out the spirit of this invention. It should also be noted that preferred embodiments of the present invention contemplate that all ranges discussed herein include ranges from any lower amount to any higher amount.

The following examples will illustrate the present invention, but are not meant to be limiting in any manner.

EXAMPLES

The $r_{50}$ and $V_{max}$, described in the examples below was derived from mercury porosimetry using a Porosimeter 2000, as described above. All $d_{50}$, BET, oil absorption, etc., unless otherwise indicated, were measured according to the techniques described above. Also, the term "inventive aluminum hydroxide grade" and "inventive filler" as used in the examples is meant to refer to an ATH according to the present invention, and "comparative aluminum hydroxide grade" is meant to refer to an ATH that is commercially available and not according to the present invention.

Example 1

By seeding a pregnant sodium aluminate liquor as e.g. disclosed in EP 1 206 412 B1, a synthetic aluminium hydroxide grade with a median particle size of $d_{50}$=2.43 μm and a specific surface of 2.6 m²/g was produced. Common separation and filtration techniques were used to separate said synthetic aluminum hydroxide; after subsequent washing steps on belt filters, the resulting aluminum hydroxide filter paste with a solid content of 61 wt. % was liquefied by adding a sufficient quantity of the dispersing agent Antiprex A40 from Ciba until the viscosity of the slurry was about 150 cPoise. The slurry was fed into a pearl mill, type KD 200 D from Bachofen/Switzerland. This mill contained 270 kg of small beads made of zirconium oxide with a diameter of 0.6 mm. The throughput of the mill was controlled so that after drying by means of a Niro F 100 spray drier and conveying of the inventive aluminum hydroxide into a silo the resulting $d_{50}$ was 1.89 μm and the specific surface was 4.9 m²/g. In the present example, the throughput was about 3 m³/h. FIG. 1 shows the specific pore volume of the inventive aluminum hydroxide grade no. 1 as a function of the applied pressure of the second intrusion test run. FIG. 2 shows the specific pore volume of the inventive aluminum hydroxide grade no. 1 as a function of the pore radius. FIG. 3 shows the normalized specific pore volume of the inventive aluminum hydroxide grade no. 1 as a function of the pore radius on a linear scale. The product properties of the inventive aluminum hydroxide grade no. 1 are contained in Table 1, below.

Example 2

Comparative

The product properties of the comparative aluminum hydroxide grade Martinal OL-104 LE produced by Martinswerk GmbH and the product properties of two competitive aluminum hydroxide grades "Competitive 1" and "Competitive 2" are also shown in Table 1.

TABLE 1

|  | Median pore radius ("$r_{50}$") (μm) | Maximum specific pore volume $V_{max}$ (mm³/g) | Median particle size $d_{50}$ (μm) | Specific BET surface (m²/g) |
|---|---|---|---|---|
| Comparative ATH OL-104 LE | 0.419 | 529 | 1.83 | 3.2 |
| Comparative 1 | 0.353 | 504 | 1.52 | 3.2 |
| Comparative 2 | 0.303 | 615 | 1.61 | 4.0 |
| Inventive ATH grade no. 1 | 0.277 | 439 | 1.89 | 4.9 |

As can be seen in Table 1, the inventive aluminum hydroxide grade no. 1, an ATH according to the present invention, has the lowest median pore radius and the lowest maximum specific pore volume.

Example 3

Figure 4:
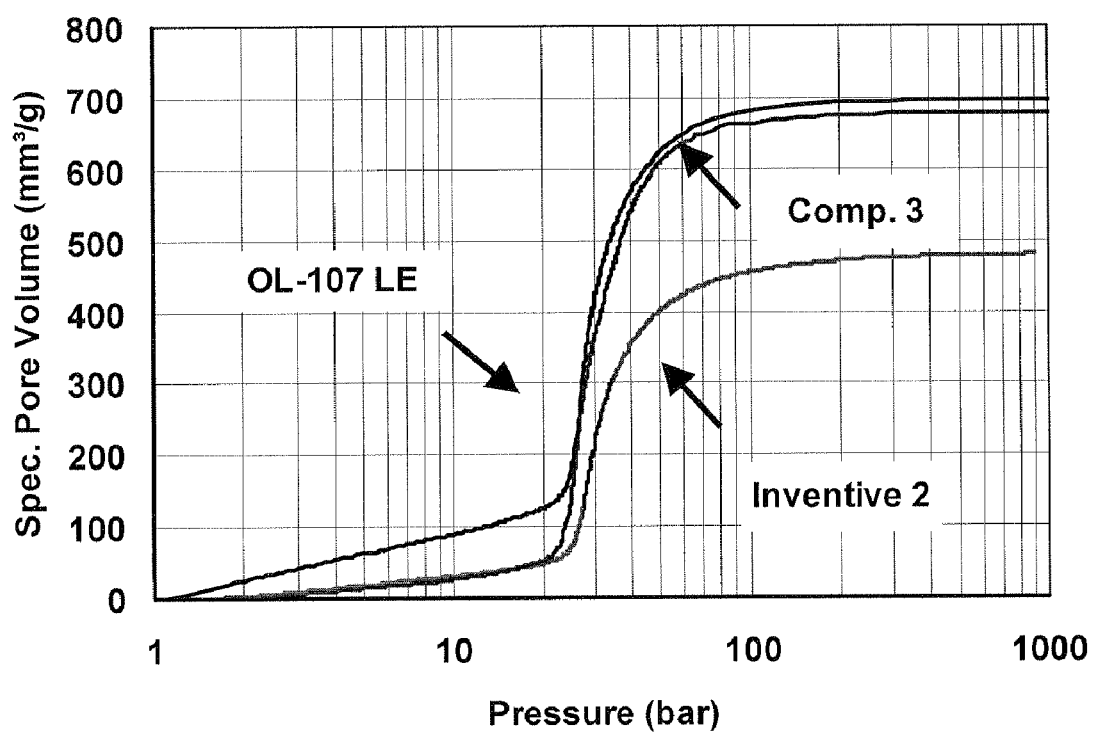
FIG. 4 shows the specific pore volume V as a function of the applied pressure for the second intrusion test run and an ATH grade no. 2, an ATH according to the present invention, in comparison with standard grades.
Figure 5:
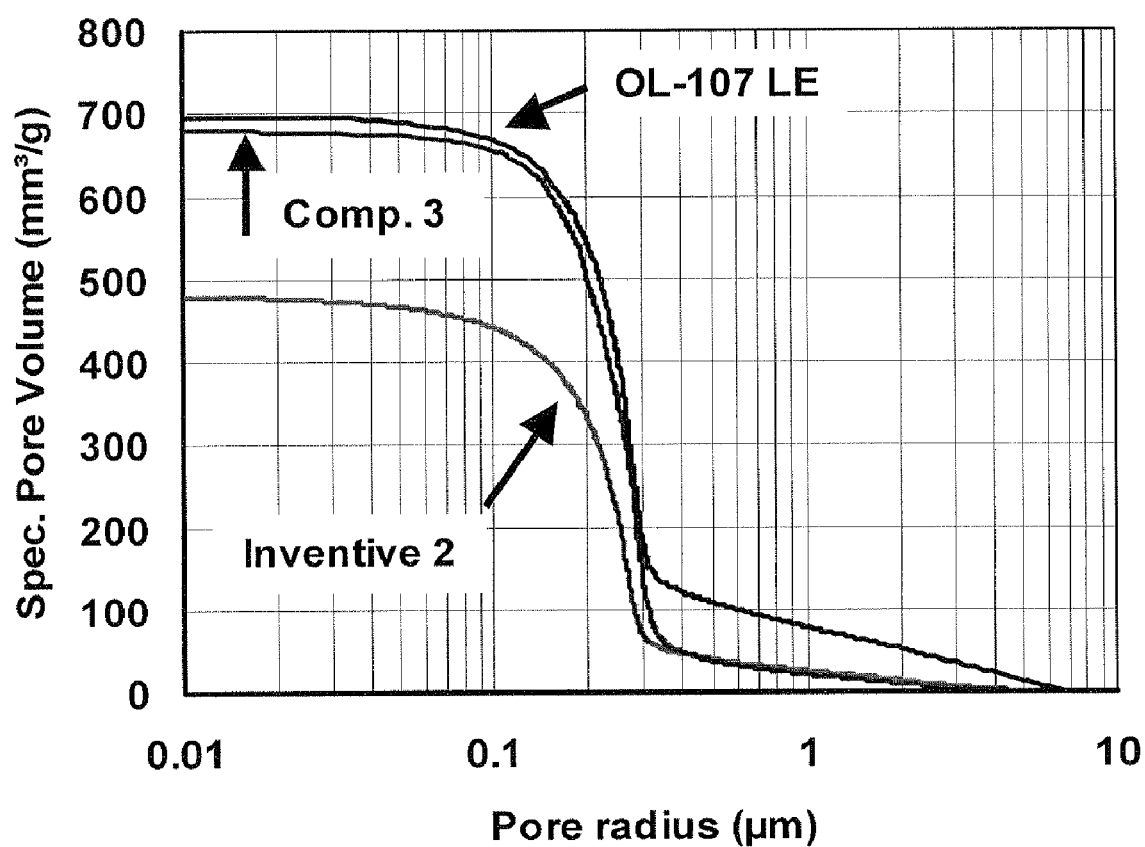
FIG. 5 shows the specific pore volume V plotted against the pore radius r for the second intrusion test run and an ATH grade no. 2, an ATH according to the present invention, in comparison with standard grades.
Figure 6:
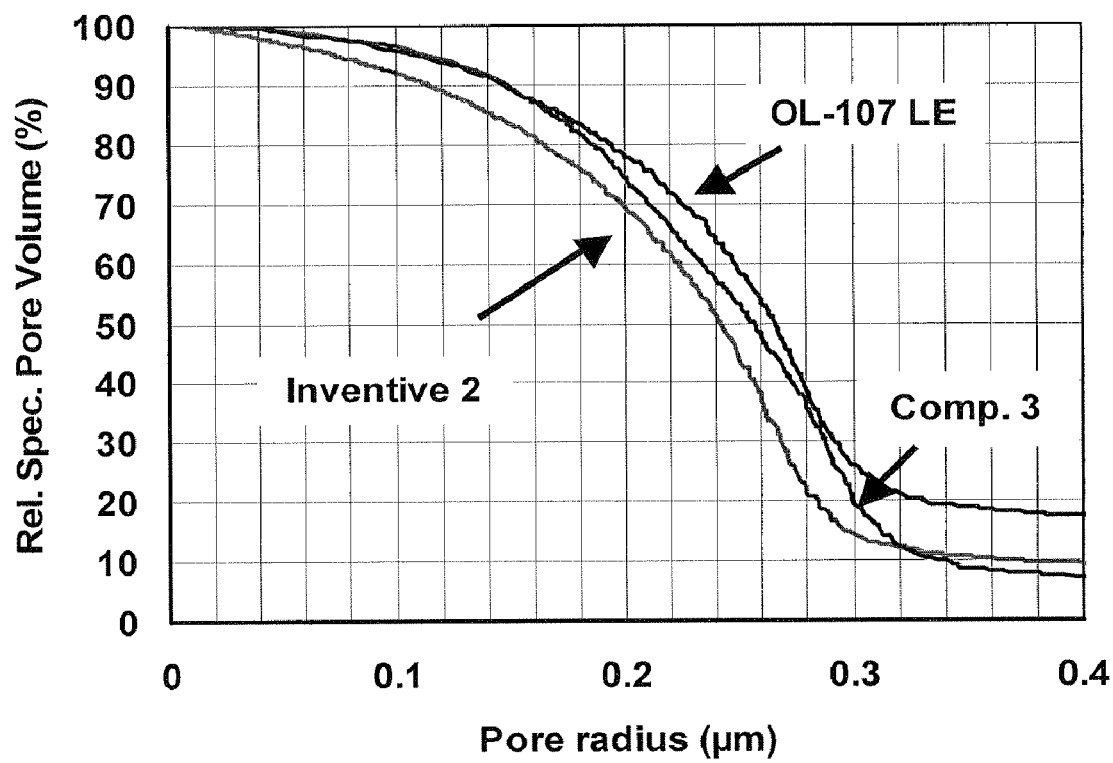
FIG. 6 shows the normalized specific pore volume for an ATH grade no. 2, an ATH according to the present invention, in comparison with standard grades, the graph was generated with the maximum specific pore volume for each ATH grade set at 100%, and the other specific volumes of the corresponding ATH grade were divided by this maximum value.

By seeding a pregnant sodium aluminate liquor as e.g. disclosed in EP 1 206 412 B1, a synthetic aluminium hydroxide grade with a median particle size of $d_{50}$=2.43 μm and a specific surface of 2.6 m²/g was produced. Common separation and filtration techniques were used to separate said synthetic aluminum hydroxide; after subsequent washing steps on belt filters, the resulting aluminum hydroxide filter paste with a solid content of 61 wt. % was liquefied by adding a sufficient quantity of the dispersing agent Antiprex A40 from Ciba until the viscosity of the slurry was about 150 cPoise. The slurry was fed into a pearl mill, type KD 200 D from Bachofen/Switzerland. This mill contained 270 kg of small beads made of zirconium oxide with a diameter of 0.6 mm. The throughput of the mill was controlled so that after drying by means of a Niro F 100 spray drier and conveying of the inventive aluminum hydroxide into a silo the resulting $d_{50}$ was 1.44 μm and the specific surface was 6.7 m²/g. In the present example, the throughput was about 2 m³/h. FIG. 4 shows the specific pore volume of the inventive aluminum hydroxide grade no. 2 as a function of the applied pressure of the second intrusion test run. FIG. 5 shows the specific pore volume of the inventive aluminum hydroxide grade no. 2 as a function of the pore radius. FIG. 6 shows the normalized specific pore volume of the inventive aluminum hydroxide grade no. 2 as a function of the pore radius on a linear scale. The product properties of the inventive aluminum hydroxide grade no. 2 are contained in Table 2, below.

Example 4

Comparative

The product properties of the comparative aluminum hydroxide grade Martinal OL-107 LE produced by Martinswerk GmbH and the product properties of the competitive aluminum hydroxide grade "Competitive 3" are also shown in Table 2.

TABLE 2

| | Median pore radius ("$r_{50}$") (μm) | Maximum specific pore volume $V_{max}$ (mm³/g) | Median particle size $d_{50}$ (μm) | Specific BET surface (m²/g) |
|---|---|---|---|---|
| Comparative ATH OL-107 LE | 0.266 | 696 | 1.35 | 6.2 |
| Comparative 3 | 0.257 | 679 | 1.23 | 6.3 |
| Inventive ATH grade no. 2 | 0.242 | 479 | 1.44 | 6.7 |

As can be seen in Table 2, the inventive aluminum hydroxide grade no. 2 has the lowest median pore radius and the lowest maximum specific pore volume.

Example 5

Figure 7:
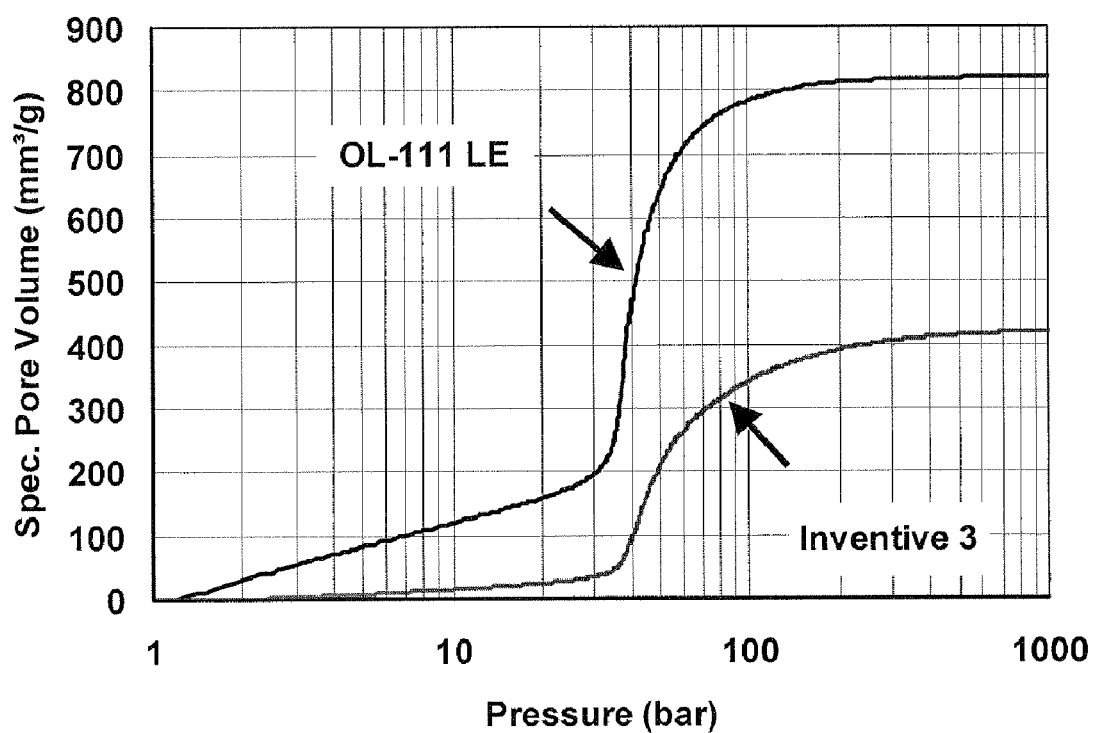
FIG. 7 shows the specific pore volume V as a function of the applied pressure for the second intrusion test run and an ATH grade no. 3, an ATH according to the present invention, in comparison with a standard grade.
Figure 8:
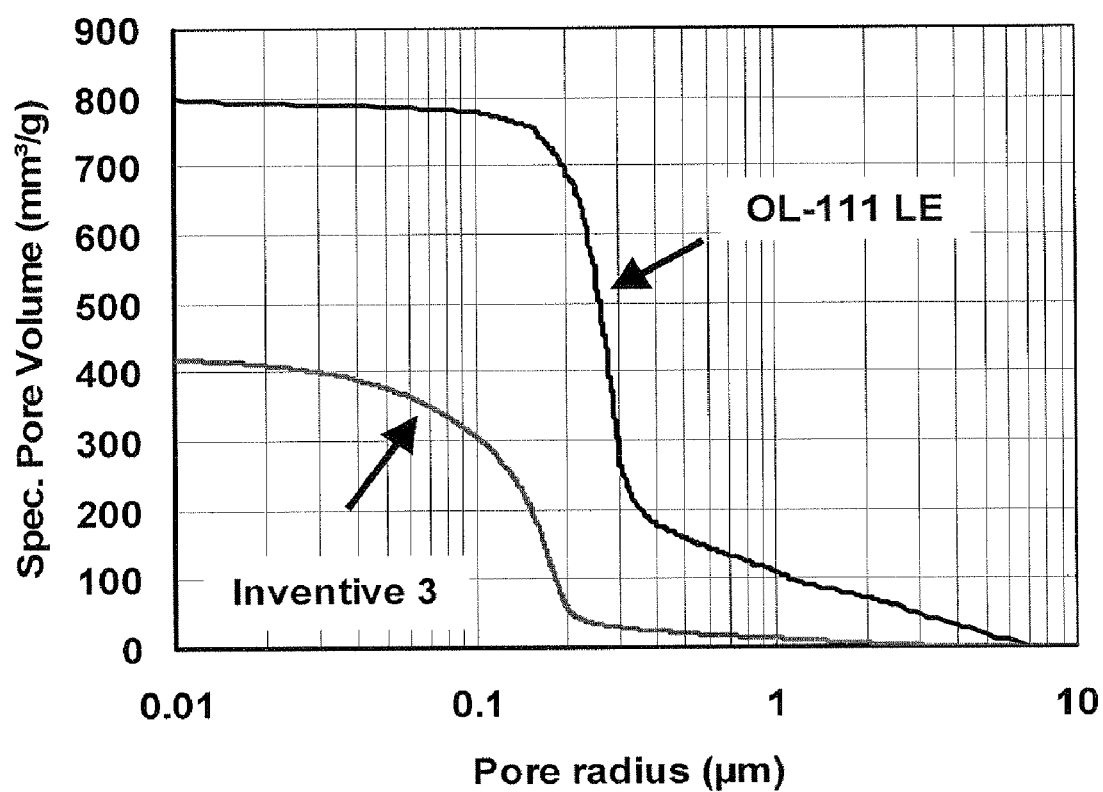
FIG. 8 shows the specific pore volume V plotted against the pore radius r for the second intrusion test run and an ATH grade no. 3, an ATH according to the present invention, in comparison with a standard grade.
Figure 9:
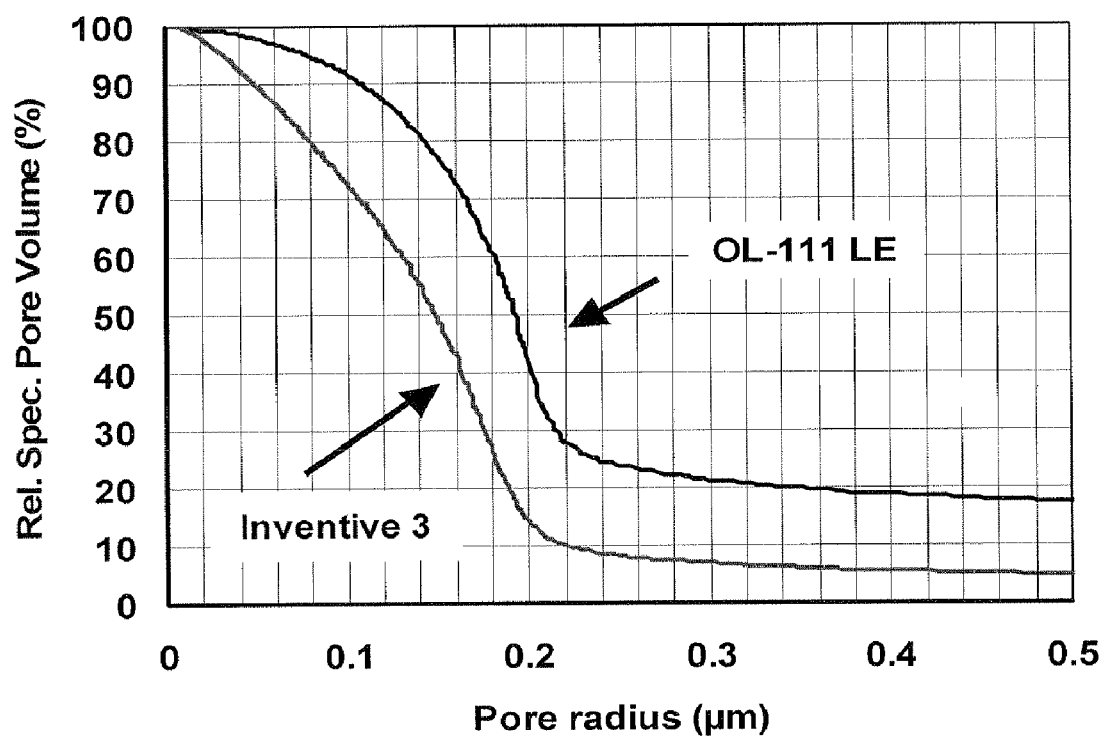
FIG. 9 shows the normalized specific pore volume for an ATH grade no. 3, an ATH according to the present invention, in comparison with standard grades, the graph was generated with the maximum specific pore volume for each ATH grade set at 100%, and the other specific volumes of the corresponding ATH grade were divided by this maximum value.

By seeding a pregnant sodium aluminate liquor as e.g. disclosed in EP 1 206 412 B1, a synthetic aluminium hydroxide grade with a median particle size of $d_{50}$=2.43 μm and a specific surface of 2.6 m²/g was produced. Common separation and filtration techniques were used to separate said synthetic aluminum hydroxide; after subsequent washing steps on belt filters, the resulting aluminum hydroxide filter paste with a solid content of 61 wt. % was liquefied by adding a sufficient quantity of the dispersing agent Antiprex A40 from Ciba until the viscosity of the slurry was about 150 cPoise. The slurry was fed into a pearl mill, type KD 200 D from Bachofen/Switzerland. This mill contained 270 kg of small beads made of zirconium dioxide with a diameter of 0.6 mm. The throughput of the mill was controlled so that after drying by means of a Niro F 100 spray drier and conveying of the inventive aluminum hydroxide into a silo the resulting $d_{50}$ was 1.36 μm and the specific surface was 10.0 m²/g. In the present example, the throughput was about 0.75 m³/h. FIG. 7 shows the specific pore volume of the inventive aluminum hydroxide grade no. 3 as a function of the applied pressure of the second intrusion test run. FIG. 8 shows the specific pore volume of the inventive aluminum hydroxide grade no. 3 as a function of the pore radius. FIG. 9 shows the normalized specific pore volume of the inventive aluminum hydroxide grade no. 3 as a function of the pore radius on a linear scale. The product properties of the inventive aluminum hydroxide grade no. 3 are contained in Table 3, below.

Example 6

Comparative

The product properties of the comparative aluminum hydroxide grade Martinal OL-111 LE produced by Martinswerk GmbH are also shown in Table 2.

TABLE 3

| | Median pore radius ("$r_{50}$") (μm) | Maximum specific pore volume $V_{max}$ (mm³/g) | Median particle size $d_{50}$ (μm) | Specific BET surface (m²/g) |
|---|---|---|---|---|
| Comparative ATH OL-111 LE | 0.193 | 823 | 1.23 | 10.1 |
| Inventive ATH grade no. 3 | 0.175 | 588 | 1.36 | 10.0 |

As can be seen in Table 3, the inventive aluminum hydroxide grade no. 3 has a lower median pore radius and a lower maximum specific pore volume.

Example 7

396.9 g (100 phr) of ethylene vinyl acetate (EVA) Escorene™ Ultra UL00119 from ExxonMobil was mixed during about 20 min on a two roll mill W150M from the Collin company with 595.4 g (150 phr) of the inventive aluminum hydroxide grade no. 1 in a usual manner familiar to a person skilled in the art, together with 4.8 g (1.2 phr) of aminosilane AMEO from Degussa AG and 2.9 g (0.75 phr) of the antioxidant Ethanox® 310 from Albemarle Corporation. The aminosilane ensures better coupling of the filler to the polymer matrix. The temperature of the two rolls was set to 130° C. The ready compound was removed from the mill, and after cooling to room temperature, was further reduced in size to obtain granulates suitable for compression molding in a two platen press or for feeding a laboratory extruder to obtain extruded strips for further evaluation. In order to determine the mechanical properties of the flame retardant resin formulation, the granules were extruded into 2 mm thick tapes using a Haake Polylab System with a Haake Rheomex extruder. Test bars according to DIN 53504 were punched out of the tape. The results of this experiment are contained in Table 4, below.

Example 8

Comparative 396.9 g (100 phr) of ethylene vinyl acetate (EVA) Escorene™ Ultra UL00119 from ExxonMobil was mixed during about 20 min on a two roll mill W150M from the Collin company with 595.4 g (150 phr) of the commercially available ATH grade OL-104 LE produced by Martinswerk GmbH in a usual manner familiar to a person skilled in the art, together with 4.8 g (1.2 phr) of aminosilane AMEO from Degussa AG and 2.9 g (=0.75 phr) of the antioxidant Ethanox® 310 from Albemarle Corporation. The aminosilane ensures better coupling of the filler to the polymer matrix. The temperature of the two rolls was set to 130° C. The ready compound was removed from the mill, and after cooling to room temperature, was further reduced in size to obtain granulates suitable for compression molding in a two platen press or for feeding a laboratory extruder to obtain extruded strips for further evaluation. In order to determine the mechanical properties of the flame retardant resin formulation, the granules were extruded into 2 mm thick tapes using a Haake Polylab System with a Haake Rheomex extruder. Test bars according to DIN 53504 were punched out of the tape. The results of this experiment are contained in Table 4, below.

TABLE 4

| | Comparative with OL-104 LE | Inventive filler no. 1 |
|---|---|---|
| Melt Flow Index @ 150° C./21.6 kg (g/10 min) | 1.8 | 1.5 |
| Tensile strength (MPa) | 12.9 | 13.4 |
| Elongation at break (%) | 221 | 214 |
| LOI (% $O_2$) | 36.2 | 38 |
| Resistivity before water aging (Ohm · cm) | $3.1 \times 10^{12}$ | $1.7 \times 10^{12}$ |
| Resistivity after 7 d@70° C. water aging (Ohm · cm) | $8.1 \times 10^{11}$ | $8.4 \times 10^{11}$ |
| Water pickup (%) | 1.25 | 1.67 |

As can be seen in Table 4, within the experimental error, the inventive aluminum hydroxide grade no. 1 has similar mechanical, rheological, electrical and flame retardant properties as the comparative grade Martinal OL-104 LE.

Example 9

396.9 g (100 phr) of ethylene vinyl acetate (EVA) Escorene™ Ultra UL00119 from ExxonMobil was mixed during about 20 min on a two roll mill W150M from the Collin company with 595.4 g (150 phr) of the inventive filler no. 2 in a usual manner familiar to a person skilled in the art, together with 4.8 g (1.2 phr) of aminosilane AMEO from Degussa AG and 2.9 g (0.75 phr) of the antioxidant Ethanox® 310 from Albemarle Corporation. The aminosilane ensures better coupling of the filler to the polymer matrix. The temperature of the two rolls was set to 130° C. The ready compound was removed from the mill, and after cooling to room temperature, was further reduced in size to obtain granulates suitable for compression molding in a two platen press or for feeding a laboratory extruder to obtain extruded strips for further evaluation. In order to determine the mechanical properties of the flame retardant resin formulation, the granules were extruded into 2 mm thick tapes using a Haake Polylab System with a Haake Rheomex extruder. Test bars according to DIN 53504 were punched out of the tape. The results of this experiment are contained in Table 5, below.

Example 10

Comparative 396.9 g (100 phr) of ethylene vinyl acetate (EVA) Escorene Ultra UL00119 from ExxonMobil was mixed during about 20 min on a two roll mill W150M from the Collin company with 595.4 g (150 phr) of the commercially available ATH grade OL-107 LE produced by Martinswerk GmbH in a usual manner familiar to a person skilled in the art, together with 4.8 g (1.2 phr) of aminosilane AMEO from Degussa AG and 2.9 g (=0.75 phr) of the antioxidant Ethanox® 310 from Albemarle Corporation. The aminosilane ensures better coupling of the filler to the polymer matrix. The temperature of the two rolls was set to 130° C. The ready compound was removed from the mill, and after cooling to room temperature, was further reduced in size to obtain granulates suitable for compression molding in a two platen press or for feeding a laboratory extruder to obtain extruded strips for further evaluation. In order to determine the mechanical properties of the flame retardant resin formulation, the granules were extruded into 2 mm thick tapes using a Haake Polylab System with a Haake Rheomex extruder. Test bars according to DIN 53504 were punched out of the tape. The results of this experiment are contained in Table 5, below.

TABLE 5

|  | Comparative with OL-107 LE | Inventive filler no. 2 |
|---|---|---|
| Melt Flow Index @ 150° C./21.6 kg (g/10 min) | 1.1 | 1.25 |
| Tensile strength (MPa) | 13.9 | 13.6 |
| Elongation at break (%) | 204 | 203 |
| LOI (% $O_2$) | 38.7 | 38.2 |
| Resistivity before water aging (Ohm · cm) | $2.6 \times 10^{12}$ | $1.5 \times 10^{12}$ |
| Resistivity after 7 d@70° C. water aging (Ohm · cm) | $6.3 \times 10^{11}$ | $7.9 \times 10^{11}$ |
| Water pickup (%) | 2.78 | 1.67 |

As can be seen in Table 5, within the experimental error, the inventive aluminum hydroxide grade no. 2 has similar mechanical, rheological, electrical and flame retardant properties as the comparative grade Martinal® OL-107 LE.

Example 11

396.9 g (100 phr) of ethylene vinyl acetate (EVA) Escorene™ Ultra UL00119 from ExxonMobil was mixed during about 20 min on a two roll mill W150M from the Collin company with 595.4 g (150 phr) of the inventive filler no. 3 in a usual manner familiar to a person skilled in the art, together with 4.8 g (1.2 phr) of aminosilane AMEO from Degussa AG and 2.9 g (0.75 phr) of the antioxidant Ethanox® 310 from Albemarle Corporation. The aminosilane ensures better coupling of the filler to the polymer matrix. The temperature of the two rolls was set to 130° C. The ready compound was removed from the mill, and after cooling to room temperature, was further reduced in size to obtain granulates suitable for compression molding in a two platen press or for feeding a laboratory extruder to obtain extruded strips for further evaluation. In order to determine the mechanical properties of the flame retardant resin formulation, the granules were extruded into 2 mm thick tapes using a Haake Polylab System with a Haake Rheomex extruder. Test bars according to DIN 53504 were punched out of the tape. The results of this experiment are contained in Table 6, below.

Example 12

Comparative 396.9 g (100 phr) of ethylene vinyl acetate (EVA) Escorene™ Ultra UL00119 from ExxonMobil was mixed during about 20 min on a two roll mill W150M from the Collin company with 595.4 g (150 phr) of the commercially available ATH grade OL-111 LE produced by Martinswerk GmbH in a usual manner familiar to a person skilled in the art, together with 4.8 g (1.2 phr) of aminosilane AMEO from Degussa AG and 2.9 g (0.75 phr) of the antioxidant Ethanox® 310 from Albemarle Corporation. The aminosilane ensures better coupling of the filler to the polymer matrix. The temperature of the two rolls was set to 130° C. The ready compound was removed from the mill, and after cooling to room temperature, was further reduced in size to obtain granulates suitable for compression molding in a two platen press or for feeding a laboratory extruder to obtain extruded strips for further evaluation. In order to determine the mechanical properties of the flame retardant resin formulation, the granules were extruded into 2 mm thick tapes using a Haake Polylab System with a Haake Rheomex extruder. Test bars according to DIN 53504 were punched out of the tape. The results of this experiment are contained in Table 6, below.

TABLE 6

|  | Comparative with OL-111 LE | Inventive filler no. 3 |
|---|---|---|
| Melt Flow Index @ 150° C./21.6 kg (g/10 min) | 1.13 | 1.22 |
| Tensile strength (MPa) | 15.7 | 15.2 |
| Elongation at break (%) | 183 | 185 |
| LOI (% $O_2$) | 38.6 | 39.6 |

As can be seen in Table 6, within the experimental error, the inventive aluminum hydroxide grade no. 3 has similar mechanical and rheological properties as the comparative grade Martinal® OL-111 LE.

It should be noted that the Melt Flow Index was measured according to DIN 53735. The tensile strength and elongation at break were measured according to DIN 53504, and the resistivity before and after water ageing was measured according to DIN 53482 on 100×100×2 mm³ pressed plates. The water pick-up in % is the difference in weight after water aging of a 10×100×2 mm³ pressed plate in a de-salted water bath after 7 days at 70° C. relative to the initial weight of the plate. The oxygen index was measured according to ISO 4589 on 6×3×150 mm³ samples.

Example 13

The comparative aluminum hydroxide particles Martinal® OL-104 LE of Example 2 and the inventive aluminum hydroxide grade no. 1 of Example 1 were separately used to form a flame-retardant resin formulation. The synthetic resin used was a mixture of EVA Escorene® Ultra UL00328 from ExxonMobil together with a LLDPE grade Escorene® LL1001XV from ExxonMobil, Ethanox® 310 antioxidant available commercially from the Albemarle® Corporation, and an amino silane Dynasylan AMEO from Degussa. The components were mixed on a 46 mm Buss Ko-kneader (L/D ratio=11) at a throughput of 25 kg/h with temperature settings and screw speed chosen in a usual manner familiar to a person skilled in the art. The amount of each component used in formulating the flame-retardant resin formulation is detailed in Table 7, below.

TABLE 7

|  | Phr (parts per hundred total resin) |
| --- | --- |
| Escorene Ultra UL00328 | 80 |
| Escorene LL1001XV | 20 |
| Aluminum hydroxide | 150 |
| AMEO silane | 1.6 |
| Ethanox 310 | 0.6 |

Figure 10:
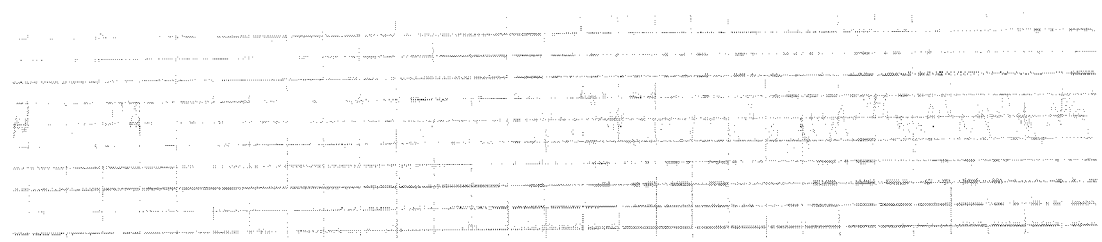
FIG. 10 shows the power draw on the motor of a discharge extruder for the inventive aluminum hydroxide grade no. 1 used in the Example 1.
Figure 11:
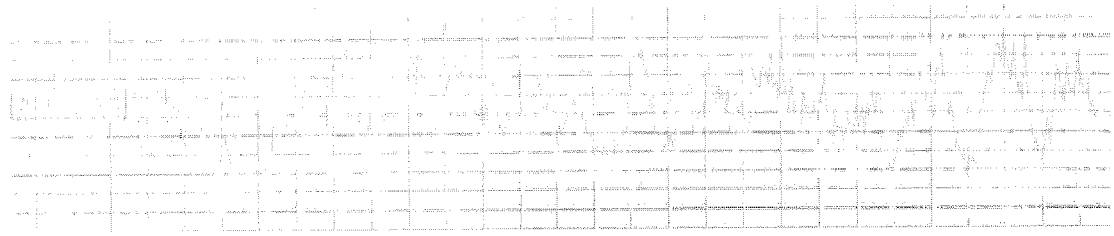
FIG. 11 shows the power draw on the motor of a discharge extruder for the comparative aluminum hydroxide grade OL-104 LE used in Example 2.

In forming the flame-retardant resin formulation, the AMEO silane and Ethanox® 310 were first blended with the total amount of synthetic resin in a drum prior to Buss compounding. By means of loss in weight feeders, the resin/silane/antioxidant blend was fed into the first inlet of the Buss kneader, together with 50% of the total amount of aluminum hydroxide, and the remaining 50% of the aluminum hydroxide was fed into the second feeding port of the Buss kneader. The discharge extruder was flanged perpendicular to the Buss Ko-kneader and had a screw size of 70 mm. FIG. 10 shows the power draw on the motor of the discharge extruder for the inventive aluminum hydroxide grade no. 1. FIG. 11 shows the power draw on the motor of the discharge extruder for the comparative aluminum hydroxide grade OL-104 LE, produced by Martinswerk GmbH.

As demonstrated in FIGS. 10 and 11, variations in the energy (power) draw of the discharge extruder are significantly reduced when the aluminum hydroxide particles according to the present invention are used in the flame-retardant resin formulation. As stated above, smaller variations in energy level allows for higher throughputs and/or a more uniform (homogenous) flame-retardant resin formulation.

What is claimed:

1. A process for producing spray-dried ATH particles comprising:

a) wet-milling a slurry comprising from about 1 to about 80 wt. % ATH, based on the total weight of the slurry, thus producing a milled ATH slurry, and b) spray-drying said milled ATH slurry thus producing spray dried ATH;

wherein said wet-milling is conducted in the presence of a liquid using spherical milling media having a diameter from about 0.1 mm to about 1.0 mm and a density from about 1.5 to about 8 g/cm³;

wherein said slurry is obtained from a process that comprises dissolving aluminum hydroxide in caustic soda to form a sodium aluminate liquor; filtering the sodium aluminate solution to remove impurities; cooling and diluting the sodium aluminate liquor; adding ATH seed particles to the sodium aluminate solution; allowing ATH particles to precipitate from the solution thus forming an ATH suspension containing from about 80 to about 160 g/l ATH, based on the suspension; filtering the ATH suspension thus forming a filter cake; and re-slurrying said filter cake to form said slurry comprising from about 1 to about 80 wt. % ATH, based on the total weight of the slurry, optionally washing said filter cake one or more times with water before it is re-slurried; and optionally c) reducing agglomerates present in said spray dried ATH.

2. The process according to claim 1 wherein said solvent is water.

3. The process according to claim 1 wherein said filter cake is re-slurried with water, a dispersing agent, or combinations thereof.

4. The process according to claim 1 wherein said slurry contains i) from about 1 to about 40 wt. % ATH particles based on the total weight of the slurry.

5. The process according to claim 1 wherein the ATH particles in the slurry are characterized as having:
a BET from about 0.5 to 8 m²/g and a $d_{50}$ from about 1.0 to 6.0 μm.

6. The process according to claim 1 wherein said spray-dried ATH has a maximum specific pore volume ("$V_{max}$") from about 390 to about 480 mm³/g, and a median pore radius ("$r_{50}$") from about 0.185 to about 0.33 μm.

7. The process according to claim 1 wherein said milling media is:
constructed of ceramic, steel, aluminum, glass or zirconium oxide ($ZrO_2$).

8. The process according to claim 1, wherein
   a) the diameter of said milling media is from about 0.4 mm to about 0.7 mm;
   b) the density of the milling media is from about 1.5 to about 3.0 g/cm³; or
   c) combinations of a) and b).

9. The process according to claim 7, wherein
   a) the diameter of said milling media is from about 0.4 mm to about 0.7 mm;
   b) the density of the milling media is from about 1.5 to about 3.0 g/cm³; or
   c) combinations of a) and b).

10. The process according to claim 1 wherein said spray dried ATH has:
   a) a BET from about 3 to about 6 m²/g, a $d_{50}$ from about 1.5 to about 2.5 μm, an oil absorption from about 23 to about 30%, an $r_{50}$ from about 0.2 to about 0.33 μm, and a $V_{Max}$ from about 390 to about 480 mm³/g;
   or
   b) a BET from about 6 to about 9 m²/g, a $d_{50}$ from about 1.3 to about 2.0 μm, an oil absorption from about 25 to about 40%, an $r_{50}$ from about 0.185 to about 0.325 µm, and a $V_{Max}$ from about 400 to about 600 mm³/g;

or c) a BET from about 9 to about 15 m²/g, a $d_{50}$ from about 0.9 to about 1.8 µm, an oil absorption from about 25 to about 50%, an $r_{50}$ from about 0.09 to about 0.21 µm, and a $V_{Max}$ from about 300 to about 700 mm³/g;

or d) an $r_{50}$ from about 0.09 to about 0.33 µm.

11. The process according to claim 1 wherein c) is present and c) is conducted in an air classifier or a pin mill.

12. The process according to claim 10 wherein the $d_{50}$ of the ATH product particles produced from c) is greater than or equal to 90% of the spray dried ATH particles and the remainder of the properties of the ATH product particles from c) are substantially the same as the properties of the spray dried ATH.

13. The process according to claim 12 wherein the bulk density of the ATH product particles from c) is higher than the bulk density of the spray-dried ATH.

14. A process for producing spray-dried ATH particles comprising:
   a) wet-milling a slurry comprising from about 1 to about 80 wt. % ATH, based on the total weight of the slurry, thus producing a milled ATH slurry, and
   b) spray-drying said milled ATH slurry thus producing spray dried ATH;

wherein said wet-milling is conducted in the presence of a liquid using spherical milling media having a diameter from about 0.1 mm to about 1.0 mm and a density from about 1.5 to about 8 g/cm³ and wherein said spray-dried ATH is characterized as having:
   i) a median pore radius from about 0.09 to about 0.33 µm; or
   ii) a BET specific surface area of from about 3 to about 6 m²/g; and a maximum specific pore volume of from about 390 to about 480 mm³/g;
   or
   iii) a BET specific surface area of from about 6 to about 9 m²/g; and a maximum specific pore volume of from about 400 to about 600 mm³/g;
   or
   iv) a BET specific surface area of from about 9 to about 15 m²/g; and a maximum specific pore volume of from about 300 to about 700 mm³/g;
   or
   v) combinations of i) with ii)-iv);

wherein said slurry is obtained from a process that comprises dissolving aluminum hydroxide in caustic soda to form a sodium aluminate liquor; filtering the sodium aluminate solution to remove impurities; cooling and diluting the sodium aluminate liquor; adding ATH seed particles to the sodium aluminate solution; allowing ATH particles to precipitate from the solution thus forming an ATH suspension containing from about 80 to about 160 g/l ATH, based on the suspension; filtering the ATH suspension thus forming a filter cake; and re-slurrying said filter cake to form said slurry comprising from about 1 to about 80 wt. % ATH, based on the total weight of the slurry, said filter cake optionally washed one or more times with water before it is re-slurried;

and optionally, c) reducing agglomerates present in said spray dried ATH.

15. The process according to claim 14 wherein the ATH particles in the slurry are characterized as having a BET from about 0.5 to 8 m²/g and a $d_{50}$ from about 1.0 to 6.0 µm.

16. The process according to claim 14 wherein said filter cake is re-slurried with water, a dispersing agent, or combinations thereof.

17. The process according to claim 14 wherein the milling media is:
   constructed of ceramic, steel, aluminum, glass or zirconium oxide ($ZrO_2$).

18. The process according to claim 15 wherein:
   a) the diameter of said milling media is from about 0.4 mm to about 0.7 mm;
   b) the density of the milling media is: i) from about 1.5 to about 3.0 g/cm³; or
   c) combinations of a) and b).

19. The process according to claim 15 wherein said slurry contains i) from about 1 to about 40 wt. % ATH particles based on the total weight of the slurry.

20. The process according to claim 15 wherein the liquid is water.

21. The process according to claim 15 wherein c) is present and c) is conducted in an air classifier or a pin mill.

22. The process according to claim 21 wherein the $d_{50}$ of the ATH product particles produced from c) is greater than or equal to 90% of the spray dried ATH particles and the remainder of the properties of the ATH product particles from c) are substantially the same as the properties of the spray dried ATH.

23. The process according to claim 22 wherein the bulk density of the ATH product particles from c) is higher than the bulk density of the spray-dried ATH.

* * * * *